US008793770B2

(12) United States Patent
Lim

(10) Patent No.: US 8,793,770 B2
(45) Date of Patent: Jul. 29, 2014

(54) METHOD FOR AUTHORIZING USE OF AUGMENTED REALITY (AR) INFORMATION AND APPARATUS

(75) Inventor: Jae-Young Lim, Incheon-si (KR)

(73) Assignee: Pantech Co., Ltd., Seoul (KR)

( * ) Notice: Subject to any disclaimer, the term of this patent is extended or adjusted under 35 U.S.C. 154(b) by 157 days.

(21) Appl. No.: 13/006,026

(22) Filed: Jan. 13, 2011

(65) Prior Publication Data

US 2012/0060226 A1     Mar. 8, 2012

(30) Foreign Application Priority Data

Sep. 2, 2010   (KR) .......................... 10-2010-0086137

(51) Int. Cl.
*H04L 29/06*         (2006.01)

(52) U.S. Cl.
USPC .................................. 726/4; 726/21; 726/28

(58) Field of Classification Search
None
See application file for complete search history.

(56) References Cited

U.S. PATENT DOCUMENTS

2009/0237328 A1    9/2009   Gyorfi et al.
2010/0138228 A1*   6/2010   Abe et al. ...................... 705/1.1

FOREIGN PATENT DOCUMENTS

| JP | 2005-308456 | 11/2005 |
| KR | 1020090044702 | 5/2009 |
| KR | 1020100022428 | 3/2010 |
| KR | 1020100025238 | 3/2010 |

* cited by examiner

*Primary Examiner* — Izunna Okeke
(74) *Attorney, Agent, or Firm* — H.C. Park & Associates, PLC

(57) ABSTRACT

A method for authorizing use of Augmented Reality (AR) information includes acquiring information regarding a location at which the AR information is to be provided, authorizing a user to use the AR information, creating attribute information including the AR information, the location information, and authority information, and transmitting the attribute information to an AR system. The AR system can register the attribute information, and can provide the AR information only to authorized users. An apparatus to authorize use of Augmented Reality (AR) information includes a location information acquiring unit, an authorization unit to authorize a user to use the AR information, and an AR information processor to create attribute information. The attribute information is transmitted to an AR system as a request for the AR system to register the attribute information so the AR system provides the AR information only to authorized users.

24 Claims, 6 Drawing Sheets

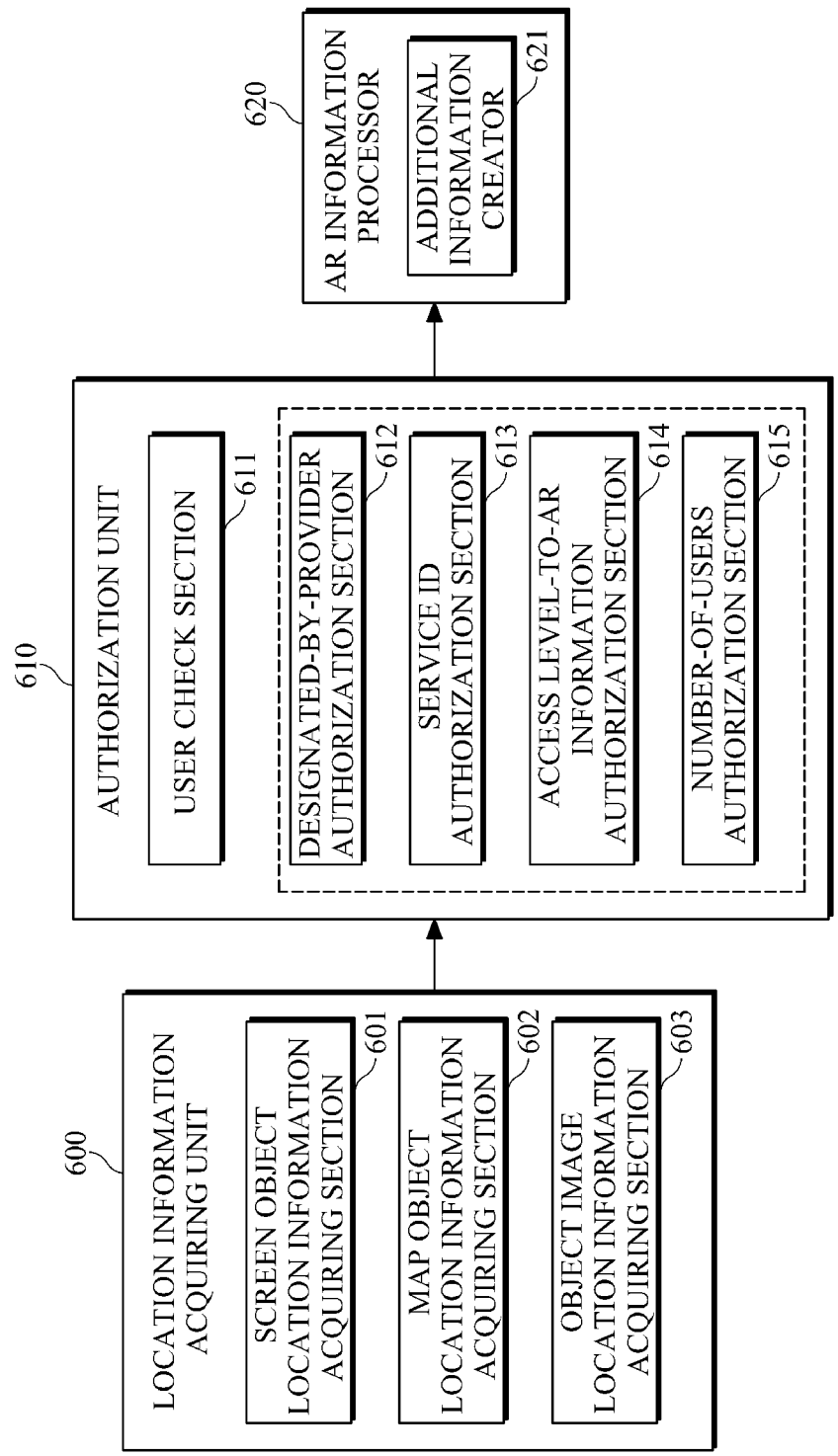

METHOD FOR AUTHORIZING USE OF AUGMENTED REALITY (AR) INFORMATION AND APPARATUS

CROSS-REFERENCE TO RELATED APPLICATION

This application claims priority from and the benefit under 35 U.S.C. §119(a) of Korean Patent Application No. 10-2010-0086137, filed on Sep. 2, 2010, which is hereby incorporated by reference for all purposes as if fully set forth herein.

BACKGROUND

1. Field

The following disclosure relates to Augmented Reality (AR), and more particularly, to a method for authorizing use of Augmented Reality (AR) information and an apparatus to perform the method.

2. Discussion of the Background

Augmented Reality (AR) is a kind of Virtual Reality (VR) that provides images in which a real world viewed by users' eyes is merged with a virtual world providing additional information. The AR is similar to existing VR, but the VR provides users with only virtual spaces and objects, whereas the AR synthesizes virtual objects based on a real world to provide additional information that cannot be easily provided in the real world. Unlike the VR based on a completely virtual world, the AR combines virtual objects with a real environment. The AR has been studied in U.S and Japan from the latter half of the 1990's and recently, with improvement in computing capability of mobile devices, such as a mobile phones and Personal Digital Assistants (PDAs), and with continued development of wireless network devices, various AR services are being provided.

For example, details and additional information associated with objects on a real environment photographed by a camera of a mobile phone are virtually created and merged with the objects on the real environment and then output or displayed on a screen. However, such a conventional AR service exposes all information through mobile phones and accordingly has drawbacks in view of information security. Furthermore, since the conventional AR service provides a user with unnecessary information regardless of the user's intention, the user may have difficulties in searching for desired information from among information provided on the screen of the mobile phone. A method of filtering desired information out from a large amount of information that is provided through a user's terminal to provide the user with only the filtered information has been developed. However, the method also causes a long delay time to process and filter out the desired information. Thus, another solution is needed.

SUMMARY

Exemplary embodiments of the present invention provide a method for authorizing users to use Augmented Reality (AR) information that is displayed on a screen of a terminal. Exemplary embodiments of the present invention also provide a terminal to authorize users to use Augmented Reality (AR) information that is displayed on a screen.

Additional features of the invention will be set forth in the description which follows, and in part will be apparent from the description, or may be learned by practice of the invention.

An exemplary embodiment of the present invention discloses a method for authorizing use of Augmented Reality (AR) information, including: acquiring information regarding a location at which the AR information is to be provided; creating authorization information comprising information about a user authorized to use the AR information; creating attribute information comprising the AR information, the location information, and the authorization information; and transmitting the attribute information to an AR system to request the AR system to register the attribute information.

An exemplary embodiment of the present invention also discloses a terminal to authorize use of Augmented Reality (AR) information, including a location information acquiring unit to acquire information regarding a location at which the AR information is to be provided, an authorization unit to create authorization information comprising information about a user authorized to use the AR information, and an AR information processor to create attribute information and to transmit the attribute information to an AR system to request the AR system to register the attribute information, the attribute information comprising the AR information, the location information, and the authorization information.

An exemplary embodiment of the present invention also discloses a method for authorizing use of Augmented Reality (AR) information, including receiving attribute information, and providing limited access to AR information according to the attribute information. The attribute information includes position information regarding a position at which the AR information is to be provided, and authorization information comprising information about users authorized to use the AR information.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 6 is a diagram illustrating a terminal to authorize use of AR information according to an exemplary embodiment.

DETAILED DESCRIPTION OF THE ILLUSTRATED EMBODIMENTS

Figure 1:
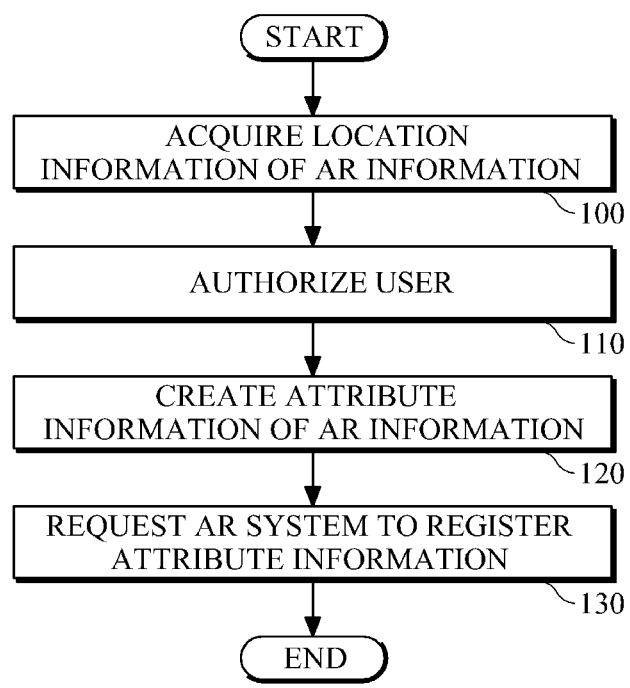
FIG. 1 is a flowchart illustrating a method for authorizing use of Augmented Reality (AR) information in a terminal according to an exemplary embodiment.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements. Throughout the drawings and the detailed description, unless otherwise described, the same drawing reference numerals will be understood to refer to the same elements, features, and structures. The relative size and depiction of these elements may be exaggerated for clarity, illustration, and convenience.

FIG. 1 is a flowchart illustrating a method for authorizing use of Augmented Reality (AR) information in a terminal according to an exemplary embodiment.

As illustrated in FIG. 1, the terminal acquires location information of Augmented Reality (AR) information selected by a provider in order to provide the AR information to one or more users (100). The provider refers to a source providing AR information, and may be a user of another terminal or another source. The terminal may acquire the location information of the AR information using a method described below, or by another method.

According to a first method, the terminal may acquire location information of a point at which AR information selected by a provider among AR information displayed on a screen is displayed. That is, the terminal may receive its own location information from an external device through a Global Positioning System (GPS) receiver installed therein or with the assist of a base station of a communication network, thus acquiring location information of a point at which selected AR information is displayed based on the received terminal's own location information.

According to a second method, the terminal may acquire location information of a point at which AR information is to be provided, based on a pre-stored digital map. In more detail, a provider selects AR information and may select a point at which the selected AR information is to be provided on a digital map stored in a terminal. Accordingly, the terminal acquires location information of the point selected by the provider from the digital map.

According to a third method, the terminal may acquire location information of AR information associated with an object image selected by a provider among multiple pre-stored object images. The location information may be based on azimuth information of object information corresponding to the selected object image and Location Based Service (LBS) information about a time at which the selected object information is photographed. That is, a provider photographs a desired region through a camera installed in a terminal to create an object image or receives the object image from another source, and the terminal stores the object image of the photographed region. The terminal creates or stores object image information including azimuth information of the corresponding object image acquired through a geo-magnetic sensor and LBS information about a time at which photographing is performed, and stores the azimuth information and LBS information together with the object image. Thereafter, if the provider selects the object image, the terminal acquires location information of the corresponding object image based on azimuth information and LBS information included in object image information associated with the selected object image.

According to a fourth method, the terminal may acquire location information of AR information that is displayed on a screen of the terminal, based on ID information of terminals registered in an AR system. The AR system stores objects and AR information including information about the objects, and also stores ID information assigned to individual registered terminals and repeater ID information including address information of a repeater for data communication with the terminals. A terminal registered in the AR system transmits a location information request message including its own ID information to a repeater, such as the repeater located closest to the terminal. The repeater which has received the location information request message from the terminal transmits a location information response message including the corresponding location information to the corresponding terminal. In this way, the terminal acquires location information of a point at which it is located, and accordingly the terminal can acquire information about its current location even in areas with limited, poor, or no GPS reception.

After location information, which is information about a location at which the AR information selected by the provider will be provided, is acquired, the terminal authorizes a user to use the AR information and creates user authority information (110). A method for authorizing a user to use AR information will be described later. The terminal also creates attribute information including the AR information selected by the provider, the location information acquired in operation 100, and the user authority information created in operation 110 (120). The terminal may create additional information including information about the validity period or importance of the AR information, and the attribute information may further include the additional information.

Then, the terminal transmits the created attribute information to the AR system and requests the AR system to register the attribute information (130). Accordingly, the attribute information is registered in the AR system, and the AR system may differentiate the AR information based on the user authority information included in the attribute information and provide the differentiated AR information to individual user terminals according to the attribute information. Hereinafter, a method for authorizing use of AR information will be described in more detail with reference to FIG. 2, FIG. 3, FIG. 4, and FIG. 5.

Figure 2:
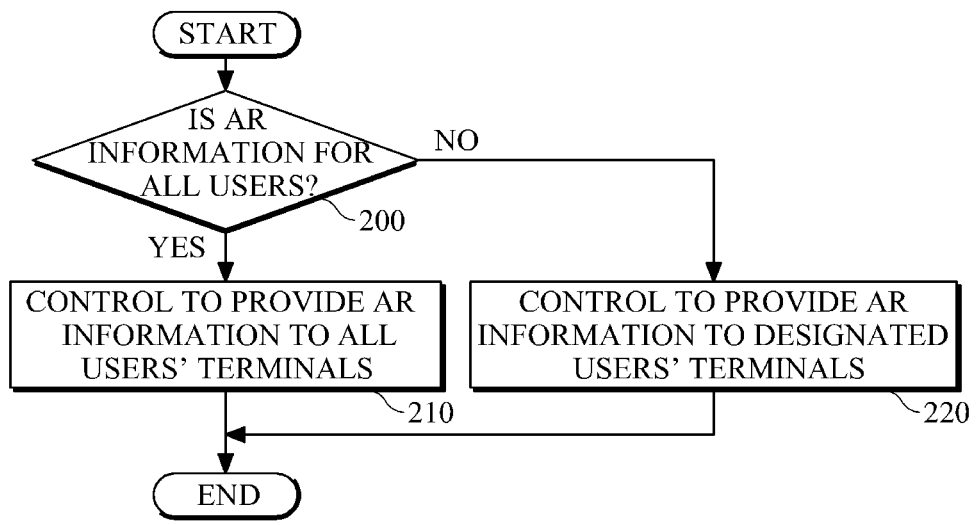
FIG. 2 is a flowchart illustrating a method for authorizing AR information to be provided to users in a provider terminal according to an exemplary embodiment.

FIG. 2 is a flowchart illustrating a method for authorizing AR information to be provided to users in a provider terminal according to an exemplary embodiment.

As illustrated in FIG. 2, the terminal determines whether AR information is to be provided to users is to be provided to all users or only to designated users (200). That is, the provider sets a range of authority on use of AR information through a terminal. That is, the terminal determines whether a range of authority on use of AR information, which has been set by the provider, is for all users or only for designated users. If the range of authority is for all users, the terminal sets the AR information to be provided to all users' terminals (210). Meanwhile, if the range of authority is for designated users only, the terminal sets the AR information to be provided only to terminals of users designated by the provider (220).

For example, the provider may cause AR information to be provided only to a specific friend. For example, there may be a scenario where the provider's friend promised the provider to meet at the exit of a subway, but the friend does not arrive on time. In this case, the provider may provide the friend with AR information including a message with information about a restaurant where the provider will wait. In order to provide AR information including a message with information about the restaurant, the provider's terminal acquires location information of a point at which the provider has requested provision of the AR information. That is, the terminal acquires location information regarding the exit of the subway, which may be selected by the provider. Then, the provider's terminal receives personal information about the friend. The personal information may be a phone number of the friend's terminal, the friend's E-mail, or some other identifying factor. Then, the provider's terminal receives, from the provider, an inputted message with information such as the location, phone number, name, etc. of the restaurant where the provider will wait. After receiving the information message, the terminal creates attribute information including the location information about the exit of the subway, the friend's personal information, and the information message received from the provider, and transmits the attribute information to the AR system. Accordingly, the attribute information is registered in the AR system. Thereafter, when the friend arrives at the exit of the subway where the friend has promised to meet the provider, the friend receives the attribute information provided by the provider from the AR system through the friend's terminal and checks the information message included in the attribute information so that the friend can come to the restaurant where the provider is waiting.

In this way, a provider may use a terminal to authorize all or limited users to receive AR information selected by the provider.

The terminal may authorize AR information to be provided to users by using the following method described with reference to FIG. 3 below.

Figure 3:
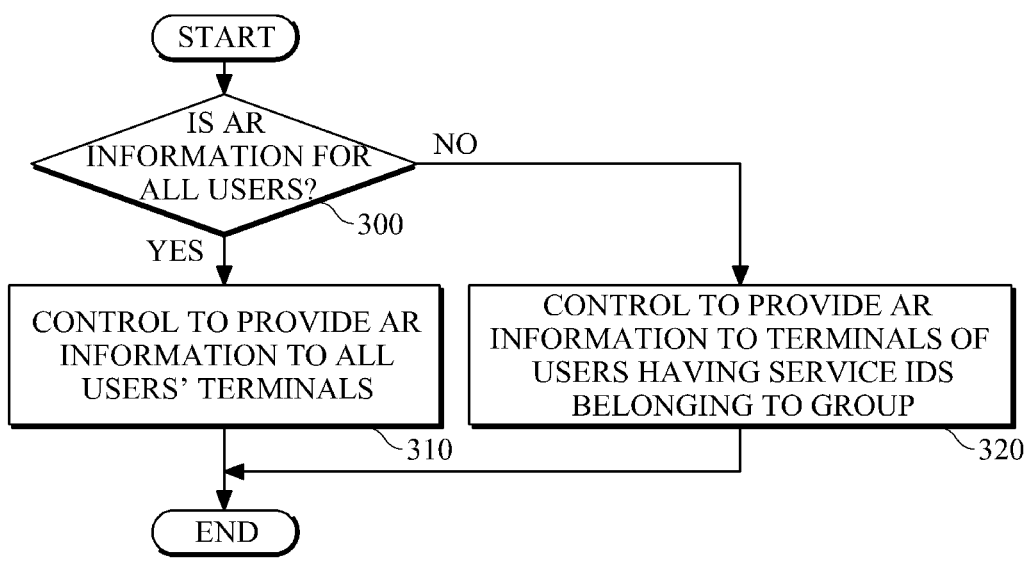
FIG. 3 is a flowchart illustrating a method for authorizing AR information to be provided to users in a provider terminal according to an exemplary embodiment.

FIG. 3 is a flowchart illustrating a method for authorizing AR information to be provided to users in a provider terminal according to an exemplary embodiment.

As illustrated in FIG. 3, the terminal determines whether AR information is to be provided to users is to be provided to all users or only to designated users (300). That is, the provider sets a range of authority on use of AR information through a terminal. That is, the terminal determines whether a range of authority on use of AR information, which is set by the provider, is for all users or only for designated users. If the range of authority is for all users, the terminal sets the AR information to be provided to all users' terminals (310). Meanwhile, if the range of authority is for designated users only, the terminal sets the AR information to be provided only to terminals of users having service IDs belonging to a defined group, which may be input by the provider, with reference to service IDs of user information registered in the AR system (320).

For example, if the provider is a school officer, the school officer may set the range of authority to provide AR information only to the school's students. In the case where the school's students go for an outing and go on a treasure hunt, the school officer may provide AR information with an information message to the students through the school officer's terminal. The terminal may acquire location information of a point at which the school officer wishes to provide AR information with an information message associated with the treasure hunt. According to an example, the school officer may select a region to which the school's student will go for an outing with reference to a digital map stored in his or her terminal or may input the name of a region to which the school's students will go for an outing. Accordingly, the school officer's terminal acquires location information of an outing region selected or input by the school officer. Then, the school officer's terminal sets a range of authority such that the AR information associated with the treasure hunt is provided only to the school's students. That is, the terminal receives the school's personal information from the provider and sets a range of authority based on the school's personal information such that attribute information associated with a treasure hunt is provided only to the school's students. Here, the school's personal information may be the phone number, name, authority code, etc. of the school and registered in the AR system. The school officer's terminal also receives an information message associated with the treasure hunt inputted from the school officer. Then, the terminal creates attribute information including the location information of the outing region, the school's personal information, and the information message associated to the treasure hunt received from the school officer, and transmits the attribute information to the AR system. Then, the attribute information is registered and stored in the AR system. That is, the AR system stores user information including ID information of terminals of students that belong to a specific "school" group. Therefore, when receiving a message for requesting attribute information from the terminals of the corresponding school's students, the AR system acquires attribute information provided by the school office from identification information included in the attribute information request message and transmits the attribute information to the student's terminals. Accordingly, the school's students receive the attribute information including the information message associated with the treasure hunt from the AR system and can go on a treasure hunt. In this way, the provider can use a terminal to authorize users belonging to a group to receive AR information selected by the provider such that only the authorized users can use the AR information.

Meanwhile, the terminal may authorize AR information to be provided to users by using the following method described with reference to FIG. 4 below.

Figure 4:
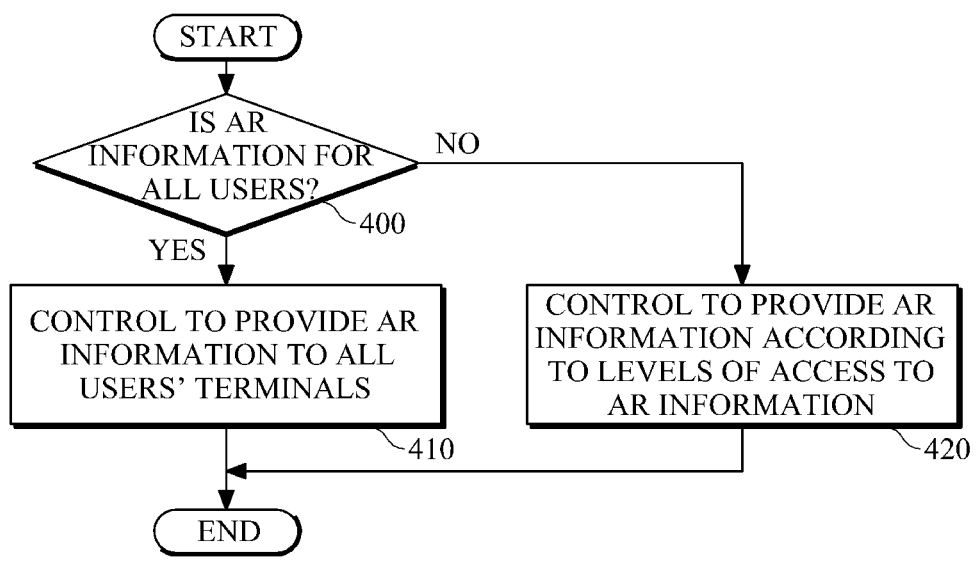
FIG. 4 is a flowchart illustrating a method for authorizing AR information to be provided to users in a provider terminal according to an exemplary embodiment.

FIG. 4 is a flowchart illustrating a method for authorizing AR information to be provided to users in a provider terminal according to an exemplary embodiment.

As illustrated in FIG. 4, the terminal determines whether AR information is to be provided to users is to be provided to all users or only to designated users (400). That is, a provider uses a terminal to set a range of authority on use of AR information. In other words, the terminal determines whether a range of authority on use of AR information, which is set by the provider, is for all users or only for designated users. If the range of authority is for all users, the terminal sets the AR information to be received by all users (410). Meanwhile, if the range of authority is for designated users only, the terminal sets the AR information to be received only by specific users according to levels of access to the AR information included in user information registered in an AR system (420).

For example, if the provider is a card company official, the card company official may provide individual members with differentiated services depending on credit card use records. If a card company has signed an event contract with a certain department store, the terminal may provide AR information including an information message associated with gifts or sales promotions according to a request from the card company's official so that card members are given different gifts or sales promotions depending on their card use records. According to this example, the terminal acquires location information of the department store that has signed the event contract. More specifically, the card company official may select a region within the department store, or may select the department store or a region of the department store with reference to a digital map stored in his or her terminal or may input the name of the department store to the terminal. Accordingly, when acquiring location information of the department store that has signed the event contract, the terminal allows card members to receive different gifts according to their card use records. That is, the terminal allows card members to receive differentiated gifts according to their levels of access to AR information in response to a request from the card company official, wherein the levels of access to AR information have been stored in the AR system. For example, the terminal allows card members having higher levels of access to AR information to be given more expensive gifts, and allows card members having lower levels of access to AR information to be given cheaper gifts. The terminal may have a gift supply guide message from the card company official to set levels of access to the AR information. Then, the terminal creates attribute information including the location information of the department store, setting information for gift supply according to the levels of access to AR information and the gift supply guide message, and transmits the attribute information to the AR system. The attribute information associated with gifts is stored in the AR system. Thereafter, when card members enter the department store or travel around the department store, they can receive attribute information including a gift supply guide message or sales promotions according to their levels from the AR system through their terminals so that they can receive corresponding gifts or coupons or other shopping promotions. In this way, the provider may authorize users through a terminal such that the users are given differentiated AR information according to their levels of access to AR information.

Figure 5:
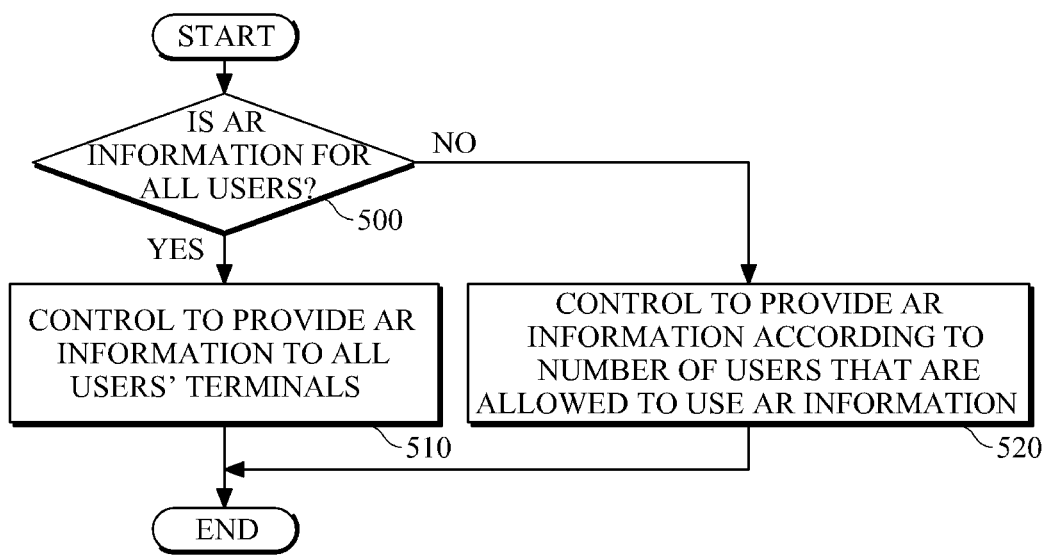
FIG. 5 is a flowchart illustrating a method for authorizing AR information to be provided to users in a provider terminal according to an exemplary embodiment.

Meanwhile, the terminal may authorize AR information to be provided to users by using the method illustrated in FIG. 5.

FIG. 5 is a flowchart illustrating a method for authorizing AR information to be provided to users in a provider terminal according to an exemplary embodiment.

As illustrated in FIG. 5, the terminal determines whether AR information is to be provided to users is to be provided to all users or only to designated users (500). That is, the provider sets a range of authority on use of AR information through a terminal. In other words, the terminal determines whether a range of authority on use of AR information is for all users or only for designated users. If the range of authority is for all users, the terminal sets the AR information to be provided to all users' terminals (510). Meanwhile, if the range of authority is for designated users only, the terminal sets the AR information to be provided only to terminals of users designated by the provider (520).

For example, if the provider is be an amusement park official, the amusement park officer may provide a predetermined service only to limited number of visitors to the amusement park. For example, the amusement park officer may supply event gifts to the first ten visitors at the amusement park's $10^{th}$ anniversary event. Accordingly, the terminal acquires location information of a gate of the amusement park. Then, the terminal controls to give event gifts to the first ten visitors. The terminal may have an event gift supply guide message from the amusement park officer. Then, the terminal creates attribute information including the location information of the gate of the amusement park, setting information for event gift supply and the event gift supply guide message. The attribute information associated with the amusement park event is stored in the AR system. Thereafter, the first ten visitors that visit the amusement park can receive AR information associated with the amusement park event from the AR system through their terminals so that they can receive event gifts. In this way, the provider may use a terminal to set a number of users who will be allowed to use object attribute information, and to provide the corresponding AR information only to the users.

In a related example, the amusement park officer may set the number of users to a limited number in a defined period of time, such as one hundred persons per hour. In this manner, if the amusement park officer can only allow a limited number of people into a certain event that occurs every hour, the amusement park officer can use the AR information to issue tickets to the limited number of people who first arrive at the designated location corresponding to the location information.

So far, a method in which a provider terminal authorizes users to use AR information has been described in more detail. Hereinafter, individual components in the terminal to authorize use of AR information will be described in more detail.

FIG. 6 is a diagram illustrating a terminal to authorize use of AR information according to an exemplary embodiment.

As illustrated in FIG. 6, the terminal includes a location information acquiring unit 600, an authorization unit 610, and an AR information processor 620. The location information acquiring unit 600 acquires location information of AR information that is selected according to a request from a provider. The location information acquiring unit 600 may include one or more of a screen object location information acquiring section 601, a map object location information acquiring section 602, and an object image location information acquiring section 603 to acquire information regarding a location to which AR information will be provided, which will be described in more detail below. The authorization unit 610 authorizes users who are selected by the provider to use the AR information. The authorization unit 610 may use a designated-by-provider authorization section 612, a service ID authorization section 613, an access level-to-AR information authorization section 614, and a number-of-users authorization section 615 to authorize use of AR information, which will be described in more detail. The AR information processor 620 creates an information message associated with the AR information input by the provider, and creates attribute information including the information message, the location information of the AR information acquired by the location information acquiring unit 600, and information about users' authorities on use of the AR information acquired by the authorization unit 610. The AR information processor 620 transmits the attribute information to an AR system to request the AR system to register the attribute information.

The AR information processor 620 may also include an additional information creator 621. The additional information creator 621 creates additional information of the corresponding AR information according to a request from the provider, wherein the additional information may be information about a validity period or an importance level of the AR information. Accordingly, the AR processor 620 creates an information message associated with the AR information input by the provider, then creates attribute information including the information message, location information of the AR information acquired by the location information acquiring unit 600, and information about users' authorities on use of the AR information acquired by the authorization unit 610, and additional information of the attribute information created by the additional information creator 621, and transmits the attribute information and additional information to the AR system to request the AR system to register the attribute information and additional information.

The configurations of the location information acquiring unit 600 and the authorization unit 610 will now be described in more detail. As described above, the location information acquiring unit 600 may include one or more of the screen object location information acquiring section 601, the map object location information acquiring section 602, and the object information location information acquiring section 603 to acquire information regarding a location at which the AR information will be provided. The screen object location information acquiring section 601 receives location information of a point at which the AR information is displayed on a screen of the terminal from an external device, or acquires location information of the AR information using ID information of the terminal registered in the AR system. That is, the screen object location information acquiring section 601 recognizes AR information selected by a provider among AR information displayed on a screen. After recognizing AR information, the screen object location information acquiring section 601 receives position information, such as GPS information, from an external device through a data communication unit (not shown) and acquires location information of a point at which the AR information is recognized based on the position information.

If the screen object location information acquiring section 601 acquires no location information from an external device, the screen object location information acquiring section 601 may acquire location information of the AR information using ID information of the terminal registered in the AR system. The AR system stores objects and AR information including information of the objects. Also, multiple terminals may be registered in the AR system, in which case the AR system may store ID information of the individual terminals and ID information including address information of a repeater for communication with the terminals. As such, since terminals have been registered in the AR system, the screen object location information acquiring section 601 transmits an information request message including ID information of the corresponding terminal to a repeater located closest to the terminal in order to acquire information regarding a current location of the terminal. Thereafter, by receiving a location information response message from the repeater, the screen object location information acquiring section 601 may acquire location information of a point at which the AR information has been selected, from the location information response message.

The map object location information acquiring section 602 acquires location information of a point selected by the provider so that AR information is provided from a digital map stored in a map storage (not shown) in response to a request from the provider. That is, the provider selects a point at which AR information is to be provided on a digital map stored in a map storage (not shown) of a terminal. Accordingly, the map object location information acquiring section 602 recognizes the point selected by the provider and acquires location information of the point. The object image location information acquiring section 603 acquires location information of AR information associated with an object image selected from among object images stored in an object image storage (not shown), based on object image information including azimuth information of the object image and LBS information on a time at which the object image has been photographed. That is, the provider photographs a desired region through a camera installed in the terminal and the terminal stores an object image of the photographed region. The terminal creates object image information including azimuth information of the object image acquired through a geo-magnetic sensor and LBS information about a time when the region has been photographed, and stores the object image information together with the object image. Thereafter, when an object image stored in the terminal is selected by the provider, the object image location information acquiring section 602 may acquire location information of AR information associated with the object image, based on azimuth information and LBS information included in object image information of the selected object image.

The location information of AR information selected by the provider may be acquired through at least one of the screen object location information acquiring section 601, the map object location information acquiring section 602, and the object image information acquiring section 603, as described above, and the authorization unit 610 uses a user check section 611 to determine whether the AR information selected by the provider is to be provided to all users or only to designated users. The authorization unit 610 may use at least one of the designated-by-provider authorization section 612, the service ID authorization section 613, the access level-to-AR information authorization section 614, and the number-of-users authorization section 615 to authorize use of the AR information.

The designated-by-provider authorization section 612 authorizes use of AR information according to a designation from the provider. If the user check section 611 determines that the AR information is to be provided to all users, the designated-by-provider authorization section 612 allows all users to use the AR information. If the user check section 611 determines that the AR information is to be provided only to designated user, the designated-by-provider authorization section 612 sets the AR information to be provided only to terminals of users designated by the provider. For example, the provider may set the AR information to be provided only to the provider's friends. That is, the provider inputs personal information of the provider's friends to the terminal in order to provide the AR information only to the friends. The personal information may be the phone numbers, E-mails, etc. of the friends' terminals. When the personal information of the friends is input to the terminal, the designated-by-provider authorization section 612 creates authorization information including the personal information input by the provider. Thereafter, the AR information processor 612 creates attribute information including the location information of the AR information, authorization information or setting information on authority to use the AR information, and an information message associated with the AR information and input by the provider, and transmits the attribute information to the AR system. Accordingly, the AR system receives the attribute information and registers and stores it therein.

If the user check section 611 determines that the AR information is to be provided to all users, the service ID authorization section 613 sets the AR information to be used by all users. If the user check section 611 determines that the AR information is to be provided only to designated users, the service ID authorization section 613 sets the AR information to be provided only to terminals of users having service IDs belonging to a group input by the provider with reference to service IDs of user information registered in the AR system. For example, if the provider is a school officer, the school officer may set a range of authority to provide AR information only to the school's students. That is, the school officer inputs information about the school or the school's students in order to allow only the school's students to use the AR information, wherein the school's information may be the name, phone number, authority code, etc. of the school. When the school's information is received, the service ID authorization section 613 creates setting information on authority including the school's information.

In this example, the AR information processor 620 creates attribute information including the location information of the point at which the AR information will be provided, the authorization information or setting information on authority, and the information message associated to the corresponding object, and transmits the attribute information to the AR system. Accordingly, the AR system registers and stores the attribute information so that only students belonging to the "school" group can receive the AR information from the AR system through their terminals.

If the user check section 611 determines that the AR information is to be provided to all users, the access level-to-AR information authorization section 614 sets the AR information to be used by all users. If the user check section 611 determines that the AR information is to be provided only to designated users, the access level-to-AR information authorization section 614 sets the AR information to be used only by specific users according to levels of access to the AR information included in user information registered in the AR system. For example, if the provider is a card company official, members of the card company may be given different levels of access to AR information according to their card use records. The different levels of access to AR information are stored in correspondence to the individual members in the AR system. Accordingly, when the card company official requests provision of AR information associated with a financial service according to card use records for individual members, the access level-to-AR information authorization unit 614 creates setting information on authority associated with provision of the financial service according to levels of access to AR information. Thereafter, the AR information processor 620 may create attribute information including the setting information on authority, LBS information on a time when the financial service will be provided, and an information message associated with the financial service, which is input by the provider, and may transmit the attribute information to the AR system. Accordingly, the AR system may provide individual users with differentiated AR information associated with the financial service according to the users' levels of access to the AR information.

If the user check section 611 determines that the AR information is to be provided to all users, the number-of-users authorization section 615 sets the AR information to be used by all users. If the user check section 611 determines that the AR information is to be provided only to designated users, the number-of-users authorization section 615 sets the AR Information to be provided to only a number of users designated by the provider. That is, the provider may set a number of users that are allowed to use the AR information. For example, if the provider sets a number of users that are allowed to use the AR information to ten, the number-of-users authorization section 615 creates authorization information or setting information on authority associated with limitation in number of users set by the provider. The AR information processor 620 creates attribute information including the setting information on authority associated with limitation in number of users, location information of a point at which the AR information will be provided, and an information message associated with the AR information, input by the provider, and transmits the attribute information to the AR system. Accordingly, the AR system may provide the AR information in correspondence to the number of users requested by the provider.

The sections of the location information acquiring unit 600 are shown as individual sections in FIG. 6. However, these sections may be combined in whole or in part when implemented as hardware, software, or a combination thereof in a terminal. Likewise, the sections of the authorization unit 610 are shown as individual sections in FIG. 6, but may be combined in whole or in part when implemented as hardware, software, or a combination thereof in a terminal. Further, the location information acquiring unit 600 and the authorization unit 610 of the terminal are shown as individual units in FIG. 6. However, these sections may be combined in whole or in part when implemented as hardware, software, or a combination thereof in a terminal, and if implemented in whole or in part as software, may be executed by a separate processor, such as a baseband processor, or by the AR information processor 620.

A number of examples have been described above. Nevertheless, it will be understood that various modifications may be made with deviating from the scope of the disclosure. For example, suitable results may be achieved if the described techniques are performed in a different order and/or if components in a described system, architecture, device, or circuit are combined in a different manner and/or replaced or supplemented by other components or their equivalents. Thus, it is intended that the present invention cover the modifications and variations of this invention provided they come within the scope of the appended claims and their equivalents.

What is claimed is:

1. A method for authorizing use of Augmented Reality (AR) information, comprising:
    acquiring location information regarding a location at which the AR information is to be provided;
    creating authorization information comprising a service identifier of a user authorized to use the AR information;
    creating attribute information comprising the AR information, the location information, and the authorization information for the AR information; and
    transmitting the attribute information to an AR system to request the AR system to register the attribute information,
    wherein the creating authorization information further comprises:
    registering the service identifier (ID) for providing AR information to a terminal authorized by the service ID,
    determining whether the AR information is to be provided to all users or only to designated users, and
    setting the AR information to be provided to terminals of all users if the AR information is to be provided to all users, and if the AR information is to be provided only to designated users, setting the AR information to be provided to terminals of users having service IDs belonging to a defined group among service IDs registered in the AR system.

2. The method of claim 1, wherein acquiring the location information comprises acquiring location information from a Global Positioning System (GPS) of a terminal corresponding to a point at which the AR information is displayed on a screen of the terminal.

3. The method of claim 1, wherein acquiring the location information comprises acquiring location information of a point selected from a digital map stored in a terminal.

4. The method of claim 1, wherein acquiring the location information comprises acquiring location information of a point at which AR information associated with an object image stored in a terminal is to be provided, based on object image information comprising azimuth information of the object image and Location Based Service (LBS) information about a time when the object image was photographed.

5. The method of claim 1, wherein acquiring the location information comprises acquiring location information of AR information displayed on a screen of a terminal based on ID information of the terminal registered in the AR system.

6. The method of claim 1, wherein creating authorization information comprises:
    determining whether the AR information is to be provided to all users or only to designated users; and
    setting the AR information to be provided to terminals of all users if the AR information is to be provided to all users, and setting the AR information to be provided only to terminals of users designated by a provider if the AR information is to be provided only to designated users.

7. The method of claim 1, wherein creating authorization information comprises:
  determining whether the AR information is to be provided to all users or only to designated users; and
  setting the AR information to be provided to terminals of all users if the AR information is to be provided to all users, and if the AR information is to be provided only to designated users, setting the AR information to be provided to terminals of users designated according to access levels registered in the AR system.

8. The method of claim 1, wherein creating authorization information comprises:
  determining whether the AR information is to be provided to all users or only to designated users; and
  setting the AR information to be provided to terminals of all users if the AR information is to be provided to all users, and if the AR information is to be provided only to designated users, setting the AR information to be provided only to terminals of a number of users designated by a provider.

9. The method of any claim 1, wherein the attribute information further comprises additional information comprising information about a validity period or importance of the AR information according to a request from a provider.

10. A terminal to authorize use of Augmented Reality (AR) information, comprising:
  a location information acquiring unit to acquire information regarding a location at which the AR information is to be provided;
  an authorization unit to create authorization information comprising a service identifier (ID) to provide the AR information to a terminal authorized by the service ID to use the AR information; and
  an AR information processor to create attribute information and to transmit the attribute information to an AR system to request the AR system to register the attribute information, the attribute information comprising the AR information, the location information, and the authorization information,
  wherein the authorization unit registers the service identifier, and
  wherein the authorization unit comprises:
  a user check section to determine whether the AR information is to be provided to all users or only to designated users, and
  a service ID authorization section to set, if the AR information is to be provided to all users, the AR information to be provided to terminals of all users, and to set, if the AR information is to be provided only to designated users, the AR information to be provided only to terminals of users having service IDs belonging to a defined group among service IDs registered in the AR system.

11. The terminal of claim 10, wherein the location information acquiring unit comprises a screen object location information acquiring section to acquire the AR information by receiving location information of a point at which the AR information is displayed on a screen of the terminal or by using ID information of the terminal registered in the AR system.

12. The terminal of claim 10, wherein the location information acquiring unit comprises an object location information acquiring section to acquire location information of a point selected from a digital map stored in the terminal.

13. The terminal of claim 10, wherein the location information acquiring unit comprises an object image location information acquiring section to acquire location information of AR information associated with an object image stored in the terminal, based on object image information comprising azimuth information of the object image and Location Based Service (LBS) information about a time when the object image was photographed.

14. The terminal of claim 10, wherein the authorization unit comprises:
  a user check section to determine whether the AR information is to be provided to all users or only to designated users; and
  a designated-by-provider authorization section to set, if the AR information is to be provided to all users, the AR information to be provided to terminals of all users, and to set, if the AR information is to be provided only to users designated by a provider, the AR information to be provided only to terminals of the designated users.

15. The terminal of claim 10, wherein the authorization unit comprises:
  a user check section to determine whether the AR information is to be provided to all users or only to designated users; and
  an access level-to-AR information authorization section to set, if the AR information is to be provided to all users, the AR information to be provided to terminals of all users, and to set, if the AR information is to be provided only to designated users, the AR information to be provided only to terminals of users designated according to access levels registered in the AR system.

16. The terminal of claim 10, wherein the authorization unit comprises:
  a user check section to determine whether the AR information is to be provided to all users or only to designated users; and
  a number-of-users authorization section to set, if the AR information is to be provided to all users, the AR information to be provided to terminals of all users, and to set, if the AR information is to be provided only to designated users, the AR information to be provided only to terminals of a number of users designated by a provider.

17. The terminal of claim 10, wherein the AR information processor comprises an additional information creator to create additional information comprising information about a validity period or importance of the AR information.

18. A method for authorizing use of Augmented Reality (AR) information, comprising:
  receiving attribute information, the attribute information comprising:
  position information regarding a position at which the AR information is to be provided; and
  authorization information comprising service identifiers (IDs) of terminals authorized by the service identifiers to use the AR information;
  registering the service identifiers; and
  providing limited access to AR information according to the attribute information,
  wherein the providing limited access comprises:
  determining whether the AR information is to be provided to all users or only to designated users; and
  setting the AR information to be provided to terminals of all users if the AR information is to be provided to all users, and if the AR information is to be provided only to designated users, setting the AR information to be provided to terminals of users having service IDs belonging to a defined group among service IDs registered in the AR system.

19. The method of claim 1, wherein the service identifier authorization information further comprises an access level for providing different AR information based on the access level.

20. The method of claim 1, wherein the service identifier comprises an authority code.

21. The method of claim 1, wherein a different level of access to the AR information is provided according to a credit card use record.

22. The terminal of claim 10, wherein the authorization information further comprises an access level to provide different AR information based on the access level.

23. The terminal of claim 10, wherein the service identifier comprises an authority code.

24. The terminal of claim 10, wherein a different level of access to the AR information is provided according to a credit card use record.

* * * * *